United States Patent [19]

Feehan

[11] Patent Number: 4,584,931

[45] Date of Patent: Apr. 29, 1986

[54] APPARATUS FOR MAKING POTATO PANCAKES

[76] Inventor: Charles A. Feehan, 8199 Walnut St., New Albany, Ohio 43054

[21] Appl. No.: 728,599

[22] Filed: Apr. 29, 1985

[51] Int. Cl.⁴ .............................................. A47J 37/12
[52] U.S. Cl. ....................................... 99/355; 99/353; 99/404; 99/407; 99/427; 99/446; 99/448; 426/438; 426/637
[58] Field of Search ................. 99/403, 404, 407, 352, 99/353, 355, 446, 356, 443 C, 448, 427; 426/438, 637

[56] References Cited

U.S. PATENT DOCUMENTS

| 1,926,313 | 9/1933 | Smith . | |
|---|---|---|---|
| 2,190,432 | 2/1940 | McKee | 99/404 |
| 2,616,359 | 11/1952 | Pierson | 99/404 |
| 2,962,984 | 1/1960 | Noel . | |
| 3,015,287 | 1/1962 | Noel . | |
| 3,680,474 | 8/1972 | Brown . | |
| 3,885,056 | 5/1975 | Smith et al. . | |
| 4,096,791 | 6/1985 | Weiss et al. . | |

OTHER PUBLICATIONS

Belshaw Advertising Brochure—Century Model 1200—Automatic Electric Fryer—Brochure S-59, 8/81.

*Primary Examiner*—Billy J. Wilhite
*Attorney, Agent, or Firm*—Sidney W. Millard

[57] ABSTRACT

A mixture of shredded potato, egg, flour, pepper, baking powder and onion are combined to form a potato pancake mixture. Discrete units of the mixture are deposited on a moving grill over a vat of cooking oil. At the discharge end of the vat of cooking oil the moving grill is raised vertically and then inverted to discharge the cooked product onto a conveyor belt which takes it to a freezing station and subsequently to a packing station.

12 Claims, 3 Drawing Figures

4,584,931

APPARATUS FOR MAKING POTATO PANCAKES

FIELD OF THE INVENTION

This invention relates to the mass production of potato pancakes, the composition of the product, and the apparatus for producing.

BACKGROUND OF THE INVENTION

Potato pancakes of various kinds are staple articles in homes and restaurants in northern Europe and much of the United States. Each cook has his own recipe and his own process for cooking the product made. A conventional recipe is found in *The Joy of Cooking*:

| Potato | 2 cups grated, dry, place in a bowl and beat well |
| --- | --- |
| Eggs | 3, stir in with potato |
| Flour | 1½ tablespoons |
| Salt | 1¼ teaspoons |
| Onion | 1-3 teaspoons, grated |

Sift flour and salt together and mix with potato and onion, divide into patties ¼ in.×3 in. and saute in ¼ in. hot fat.

Apparatus for mass production of fried articles of food involve a cooking vat filled with hot cooking oil, means for depositing food on a conveyor belt, the conveyor belt conveys the materials to be cooked into and out of the vat where the cooking takes place and a means for collecting the cooked product.

SUMMARY OF THE INVENTION

This invention is specifically designed for mass production of partially cooked potato pancakes. The process starts with raw potatoes, eggs, wheat flour, white pepper, and onion and combines it in a unique way and in unique quantities prior to mixing the ingredients to a uniform consistency. Prior to the time the products are combined the potato is peeled and then soaked in a whitener to prevent the oxidation of the starch in the raw potato, the potato is shredded to the desired size and mixed with the other ingredients, in proportion, to uniform consistency. Then an apparatus deposits a specified amount of the mixture on a moving grill immediately above and in contact with cooking oil in a vat. The grill moves along the top of the cooking oil for about half a minute and then the grill is lifted up and out of contact with the cooking oil and inverted to cause the gravitational separation of the grill and the fried potato pancake.

The potato pancake falls gravitationally from the grill onto a second conveyor belt and any oil on the grill or remaining on the pancake will fall through the second conveyor belt into a drip pan which is sloped toward the vat of cooking oil. The second conveyor belt moves the potato pancake into a freeezing chamber where the temperature is reduced to below 10° F. This is a satisfactory temperature for preventing the deterioration of the flavor and texture of the product if it is maintained in frozen condition until the product is reheated for consumption. The product should be packaged in air tight packages after freezing.

Objects of the invention will be clear from an observation of the appended drawings and a review of the description of the preferred embodiments which follow.

DESCRIPTION OF THE PREFERRED EMBODIMENTS

For convenience the invention will be described in the procedural sequence for making the product because the procedural steps and the apparatus are intimately connected.

Figure 1:
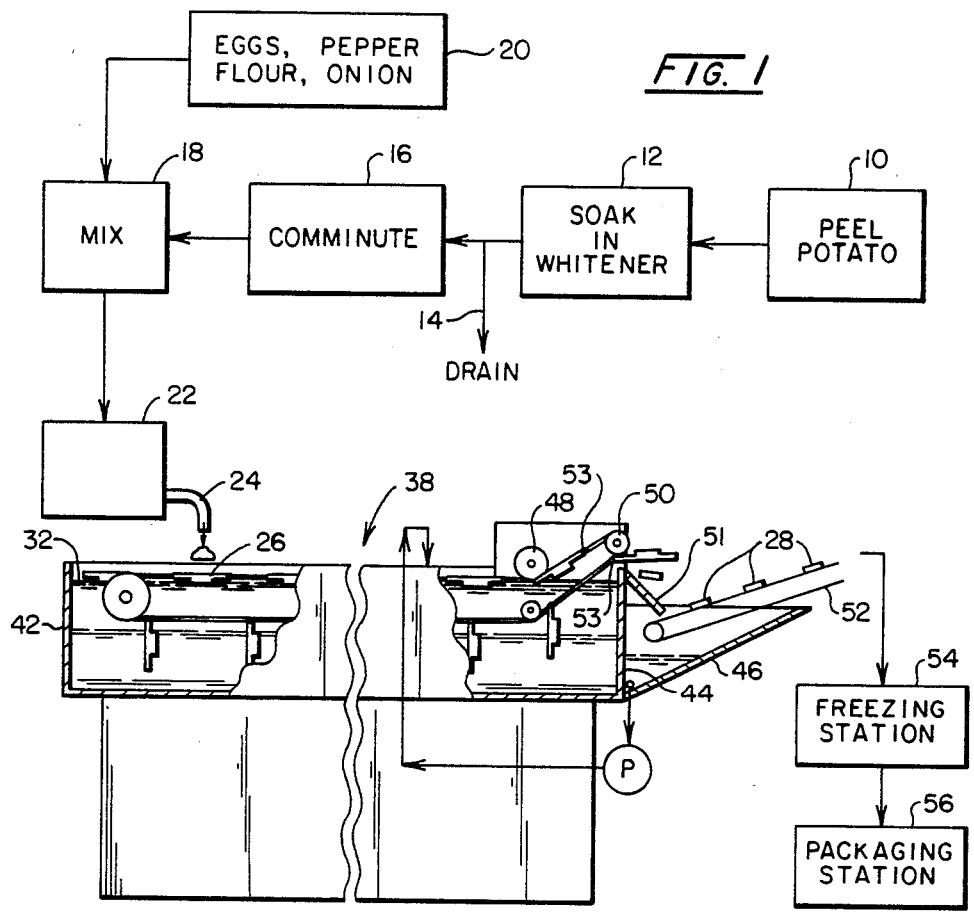
FIG. 1 is a schematic view of the sequential operation of the apparatus of this invention.

Looking first to FIG. 1, the potatoes are initially peeled at 10 and the peeled potatoes are deposited in a vat to soak for about one hour in a "whitener". Whiteners (sodium acid pyrophosphate) are conventional products in the industry and are used to retard the oxidation of starch in the potato and thereby prevent its darkening.

After the potatoes are removed from the whitener they are allowed to drain at 14 before they are comminuted at 16. It is desirable that the largest proportion of the potato pieces be in strands no more than about one thiry-second to one sixteenth inches (0.1–0.2 cm) in diameter and no more than about three-quarter inches (1.5–2.0 cm) long. The reason for the particular dimensions is the texture and cohesiveness achieved with the other ingredients which will be enumerated subsequently. Smaller pieces of potato blend in with the larger strands to help the product hold its shape. Without the particular dimensions of the potato strands the flavor and texture are inconsistent with that desired and the potato pancake after being partially cooked tends to break apart in the package. With the dimensions, the texture is excellent and there is little product separation.

After comminution of the potatoes they are transported to a mixer 18 where they are mixed with raw eggs, white pepper, wheat flour and raw or freeze-dried onion. The onion is shredded or diced into pieces about the same size as the potato pieces.

The proportions of the mixture are about:

| Potatoes | 50 lbs. (22.7 kilos) |
| --- | --- |
| Eggs | 2 dozen |
| Whitener (powder) | 6 tablespoons |
| Flour | 5 lbs. (2.3 kilos) |
| Onion | 5 lbs. (2.3 kilos) |
| White Pepper | 5 ozs. (0.14 kilos) |
| Baking powder | 1 teaspoon |

From the mixer 18 the ingredients are conveyed to a holding tank 22 and specific amounts of the mixture are discharged from nozzles 24 onto a moving segmented grill 26.

The particular feeding apparatus for discharging the desired amount of potato pancake mixture from nozzles 24 is conventional and need not be described here. It is desired that the amount of potato pancake mixture being discharged onto the grill 26 be about ½ oz. (14 grams).

For reasons which will be explained subsequently, a certain amount of cooking oil will be on the grill 26 and absorbed by the potato pancake while it is cooking. The cooking process will drive off a certain amount of moisture and the moisture lost is roughly the equivalent of the amount of cooking oil absorbed so that the resulting potato pancake will be about ½ oz. in the partially cooked condition when it is frozen.

Figure 2:
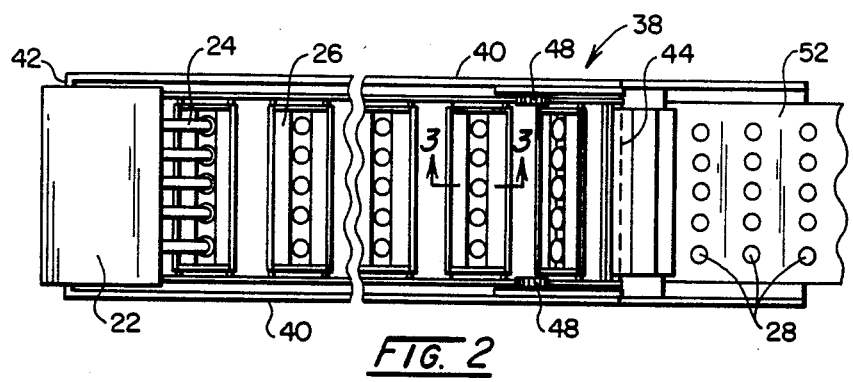
FIG. 2 is a plan view of a part of FIG. 1 illustrating the cooking apparatus.

The segmented grill 26 includes a plurality of discrete units of stainless steel deformed to house and cook the potato pancake mixture. The item is perhaps best illustrated in FIGS. 2 and 3. The stainless steel is itself about 0.015 inch thick, thirty-four inches wide and about four inches in the dimension shown in cross section in FIG. 3.

Each potato pancake 28 is deposited into a depression 30 in the grill. This serves to localize each deposit and prevent the indiscriminate spreading of the mixture along the grill which might cause the merging of two or more of the pancakes, and that is undesirable. The placing of the depressions 30 are on three inch centers.

As can be seen in the fragmentary area on the left side of FIGS. 1 and 3, the segmented grill is slightly immersed in the cooking oil below surface 32 and as it rises above the surface, the cooking oil drains out for the most part. However, some cooking oil is retained on the top surface of the grill and will run out between the side gaps 34, best seen in FIG. 3, or will collect in the depression 30. It is desirable not to have the cooking oil lapping up and over the top of the grill surface and to minimize direct contact, a lip 36 (about ½ in height) is located at the forward advancing end of the grill. The lip 36 will prevent the oversaturation of the potato pancake by cooking oil.

Figure 3:
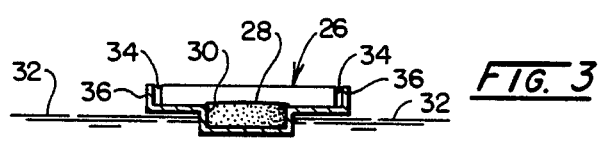
FIG. 3 is a sectional view a part of the grill taken along line 3—3 of FIG. 2.

While FIG. 3 shows drain gaps 34 at both the front and rear of the grill, it may be desirable to have a single drain at the rear of the grill.

The cooking oil is housed within a vat 38 having sides 40, a front end 42 and a discharge end 44 which merges with a drip pan 46 sloping from outside the pan downward toward the vat.

As the grill traverses the vat it will cook the potato pancake on one side only and it is the intent only to blanch the product to hold it together until it is ready for later consumption. In the preferred embodiment the product is cooked at about 350° F. for a period of about 30 seconds. The cooking oil may be maintained at a temperature slightly elevated above 350° F. to maintain the grill itself at the 350° F. temperature. Obviously, the colder potato pancake product, as it is deposited on the grill, will absorb heat and reduce the surface temperature slightly. In any case, when the blanched, partially cooked potato pancake arrives at the discharge end 44, it is desirable to discharge the pancake 28 from the grill 26 and this is accomplished by changing the direction of the moving grill to raise it above the surface of the cooking oil. Note that the lower part of the grill is always in contact with the upper surface 32 of the cooking oil during the cooking procedure. At the discharge end 44 of the vat 38 a roller or sprocket wheel 48 of some kind engages the side edges of the grill to hold it down in the cooking oil. Immediately beyond roller 48 the grill rises at an angle out of the cooking oil, drawn in that direction by roller 50. When the cooked potato pancake and grill pass over the roller 50, the grill is rotated through an arc of over 90° such that the potato pancakes 28 are discharged by gravity from the grill and they land on a sloped surface 51 and slide onto conveyor belt 52 which conveys them to a freezing station 54.

To assist in discharging the pancake from the grill, each segment is hinged 53 at its forward end and thus, when it passes over the roller 50, it will flop down and strike the surface 51 and the pancake 28 will be jarred loose. The hinge 53 has another function; it minimizes stress on the conveyor in the vat. With the grill hinged on only one edge the conveying strands will not have to stretch as they turn over the roller 50. On the other hand, if both the forward and rear edges are pinned to the conveying strands, the continual stretch and relax sequence would weaken the strands prematurely.

Note that when the grill flops down, it will impact against the edge 44 of the vat where it merges with surface 51 and the point of impact by the grill is separated from the pancake 28 itself so that the jarred pancake is not deformed by the location of contact between the grill and the sloped surface 51.

After the products are frozen at about −10° F., they are packaged at 56 in convenient air-tight packages and then conveyed to a storage compartment where the temperature is maintained at −10° F. until consumption is desired. Then the product may be cooked by any conventional method. The preferred method is to deep fry them but the final preparation may be varied to individual taste and salt or other ingredients may be added.

Experiments with various ingredients and sizes of the components have shown that the combination of the comminution of the potato and onion in the manner suggested combined with the egg and blanching for the short period holds the product together with a minimum of breaking during packaging and packaging movement.

Adding the small amount of powdered whitener to the mixture prior to blanching prevents the frozen pancake from darkening during the storage and subsequently during cooking.

The cooking oil on the top of the grill during the cooking process will assist in heat transfer from the grill to the cooking product and will prevent sticking to some extent but, in order to ensure an easy and reliable discharge from the grill solely by gravity, the upper grill surface will be treated with a SILVERSTONE process in a well known convention fashion.

Having thus described the invention in its perferred embodiment, modifications will be obvious to those having ordinary skill in the art. It is not intended that the words used to describe the invention nor the drawings illustrating the same be limiting on the invention. Rather, it is intended that the invention be limited only by the scope of the appended claims.

I claim:

1. Apparatus for frying potato pancakes comprising,
  a vat having sides and two ends for holding hot cooking oil,
  a moveable, segmented frying grill having upper and lower surfaces,
  means for moving said grill along said vat at a level to prevent oil from rising above the upper surface and for keeping the lower surface in contact with said oil,
  said moving means including roller means for turning the upper grill surface through a downward arc and gravitationally separting the grill from any objects on the upper grill surface, said roller means being located near one end of said vat,
  a conveyor belt below said roller means for receiving said separated objects,
  said grill including longitudinally aligned circular depressions for retaining in place those objects deposited on said grill for frying, said depressions being about 2 inches (5 cm) in diameter and about ¼ inch (0.63 cm) in depth, means for depositing in each said depressions a mixture of comminuted potato, flour and eggs, said depositing means being located above said grill near the end of said vat remote from said roller means, means for heating oil in said vat to a temperature sufficient to maintain the upper surface of said grill at a temperature of about 350° F. and means for minimizing direct contact between oil in said vat and said potato mixture on said grill.

2. The apparatus of claim 1 wherein the depositing means is configured to deposit discrete units of said mixture of about one-half ounce (14 gm) in wet weight, said mixture proportionally including about 50 pounds of comminuted potato, 2 dozen raw eggs and 5 pounds of flour, said comminuted potato primarily including pieces about 1/10–1/32 inches in diameter and ½–¾ inches in length.

3. The apparatus of claim 2 including a drip pan below said conveyor to collect a liquid draining from said cooked mixture.

4. The apparatus of claim 3 wherein the means for minimizing direct contact comprises an upwardly extending lip on the edge of the grill nearest the roller means.

5. The apparatus of claim 3 including locating said roller means above the level of the top of the vat.

6. The apparatus of claim 5 wherein the measurement from the lower surface of said grill to the upper edge of said lip is about ½ inches (1.3 cm).

7. The apparatus of claim 2 wherein the means for minimizing direct contact comprises an upwardly extending lip on the edge of the grill nearest the roller means.

8. The apparatus of claim 7 wherein the measurement from the lower surface of said grill to the upper edge of said lip is about ½ inches (1.3 cm).

9. The apparatus of claim 1 including a drip pan below said conveyor to collect a liquid draining from said cooked mixture.

10. The apparatus of claim 1 wherein the means for minimizing direct contact comprises an upwardly extending lip on the edge of the grill nearest the roller means.

11. The apparatus of claim 10 wherein the measurement from the lower surface of said grill to the upper edge of said lip is baout ½ inches (1.3 cm).

12. The apparatus of claim 1 including locating said roller means above the level of the top of the vat.

* * * * *